United States Patent
Woods et al.

(10) Patent No.: US 10,649,802 B2
(45) Date of Patent: May 12, 2020

(54) COMPONENT BASED DYNAMIC GUEST INSTANTIATION

(71) Applicant: Red Hat, Inc., Raleigh, NC (US)

(72) Inventors: Willard Gordon Woods, Raleigh, NC (US); David Lawrence Cantrell, Jr., Medford, MA (US)

(73) Assignee: Red Hat, Inc., Raleigh, NC (US)

(*) Notice: Subject to any disclaimer, the term of this patent is extended or adjusted under 35 U.S.C. 154(b) by 220 days.

(21) Appl. No.: 15/927,713

(22) Filed: Mar. 21, 2018

(65) Prior Publication Data

US 2019/0294461 A1    Sep. 26, 2019

(51) Int. Cl.
G06F 9/455    (2018.01)
G06F 16/16    (2019.01)

(52) U.S. Cl.
CPC ........ G06F 9/45558 (2013.01); G06F 16/164 (2019.01)

(58) Field of Classification Search
CPC .................................................. G06F 9/45558
See application file for complete search history.

(56) References Cited

U.S. PATENT DOCUMENTS

| | | |
|---|---|---|
| 5,297,291 A | 5/1994 | Murphy |
| 8,821,276 B2 | 9/2014 | Sitrick |
| 8,903,761 B1 | 12/2014 | Zayas et al. |
| 9,575,770 B2 | 2/2017 | Carlson et al. |
| 9,841,953 B2 | 12/2017 | Laskey et al. |
| 10,210,172 B1 * | 2/2019 | Konig ............... H04L 67/06 |
| 2013/0332917 A1 * | 12/2013 | Gaither ............... G06F 8/656 717/170 |
| 2018/0048660 A1 * | 2/2018 | Paithane ........... G06F 21/6218 |

* cited by examiner

*Primary Examiner* — Sisley N Kim
(74) *Attorney, Agent, or Firm* — K&L Gates LLP

(57) ABSTRACT

Component based dynamic guest instantiation is disclosed. For example, a memory stores a content store, and a virtualization engine executes on one or more processors to receive a request to launch an application that is configured to execute in a guest. A file system of the guest is constructed based on metadata associated with the application. A plurality of components of the application, including a first component defined in the metadata, are loaded to the file system from the content store. The first application is launched in the guest.

17 Claims, 8 Drawing Sheets

COMPONENT BASED DYNAMIC GUEST INSTANTIATION

BACKGROUND

The present disclosure generally relates to scheduling guests in computing environments, specifically shared computing environments such as cloud computing environments. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests enable a programmer to quickly scale the deployment of applications to the volume of traffic requesting the applications. Isolated guests may be deployed in a variety of hardware environments. There may be economies of scale in deploying hardware at a large scale. To attempt to maximize the usage of computer hardware through parallel processing using virtualization, it may be advantageous to maximize the density of isolated guests in a given hardware environment, for example, in a multi-tenant cloud. In many cases, containers may be leaner than virtual machines because a container may be operable without a full copy of an independent operating system, and may thus result in higher compute density and more efficient use of physical hardware, enabling additional flexibility and scalability of deployment. Multiple containers may also be clustered together to perform a more complex function than the respective containers are capable of performing individually. In an example, a container and/or a cluster of containers may be implemented specifically to execute certain specific tasks and/or types of tasks. A guest such as a virtual machine or container may typically include many components that the applications configured in the guest depend on for proper execution.

SUMMARY

The present disclosure provides a new and innovative system, methods and apparatus for component based dynamic guest instantiation. In an example, a memory stores a content store, and a virtualization engine executes on one or more processors to receive a request to launch an application that is configured to execute in a guest. A file system of the guest is constructed based on metadata associated with the application. A plurality of components of the application, including a first component defined in the metadata, are loaded to the file system from the content store. The first application is launched in the guest.

Additional features and advantages of the disclosed method and apparatus are described in, and will be apparent from, the following Detailed Description and the Figures.

DETAILED DESCRIPTION OF EXAMPLE EMBODIMENTS

Figure 1:
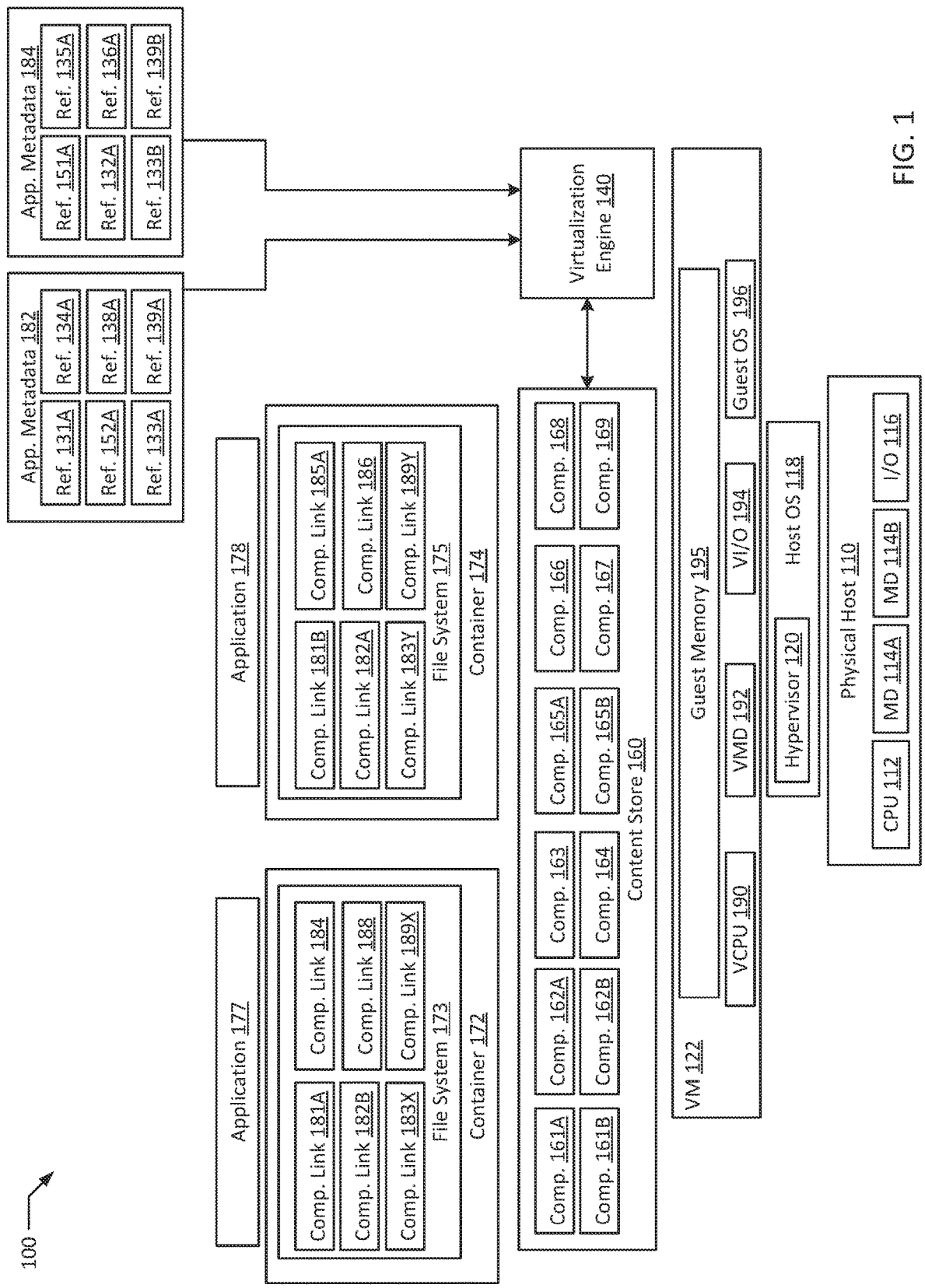
FIG. 1 is a block diagram of a component based dynamic guest instantiation system according to an example of the present disclosure.

In computer systems utilizing isolated guests, typically, virtual machines and/or containers are used. In an example, a virtual machine ("VM") may be a robust simulation of an actual physical computer system utilizing a hypervisor to allocate physical resources to the virtual machine. In some examples, a container based virtualization system such as Red Hat® OpenShift® or Docker® may be advantageous, as container based virtualization systems may be lighter weight than systems using virtual machines with hypervisors. In the case of containers, oftentimes a container will be hosted on a physical host or virtual machine that already has an operating system executing, and the container may be hosted on the operating system of the physical host or VM. This oftentimes allows a container to be constructed without a full standalone operating system, significantly reducing overhead. In large scale implementations, container schedulers, such as those included in container orchestrators (e.g., Kubernetes®), generally respond to frequent container start-ups and cleanups with low latency through their scheduler components. Containers may enable wide spread, parallel deployment of computing power for specific tasks. In a typical example, a container may be instantiated to process a specific task and reaped after the task is complete. By packaging an application in a guest such as a VM or a container, a developer may be assured that all of the necessary components for the application to execute are present and available for the application's use, greatly reducing potential compatibility problems presented by various hosting platforms, such as those in different cloud environments.

Due to economies of scale, containers tend to be more advantageous in large scale hardware deployments where the relatively fast ramp-up time of containers enables for more flexibility for many different types of applications to share computing time on the same physical hardware, for example, in a private or multi-tenant cloud environment. In some examples, where containers from a homogenous source are deployed, it may be advantageous to deploy containers directly on physical hosts. In some multi-tenant clouds, it may be advantageous to deploy containers and groups of containers within virtual machines as the hosting service may not typically be able to predict dependencies for the containers such as shared operating systems, and therefore, using virtual machines adds flexibility for deploying containers from a variety of sources on the same physical host. In an example, a physical and/or virtual host node may host hundreds of containers, each of which may independently execute tasks.

In virtualized computer systems, image files may be used for creating hosting environments (e.g., VMs, containers, and clusters of containers) for running application programs. In a typical example, the runtime environment necessary for the running of desired application code can be loaded onto the computer system in the form of an image file, for example, a Docker® image file or an image file for building a virtual machine. These image files may be collections of logical subunits of data, for example, container layers or programs installed as part of a virtual machine build. To streamline the creation of hosting environments, guest image files are typically constructed from individual layers, each of which includes one or more necessary components for the desired operation of the applications intended to run in the guest, these layers combining together to form an image file to launch one (e.g., a single VM, a single container) or more guests (e.g., Kubernetes® pod) for the desired purpose. A layer may be as large as a full operating system or as small as an individual configuration file, and it is not uncommon to need dozens of layers in a full image file. Each layer may provide a specific functionality necessary for the successful operation of the application in the container. These container image definitions are generally stored in the form of container images, available to be distributed to a wide array of host nodes as required.

In a typical example, layers in container images are built on top of each other where each layer inherits an immutable parent-child relationship. Typically, guest images are constructed in a classic single inheritance model where layers in container images are built on top of each other, and each layer inherits an immutable parent-child relationship with the layer below it. For example, a guest with three layers A, B and C, would be the parent of a guest image with four layers, for example, A, B, C and D. In the example, guest image ABC would be the parent of guest image ABCD, which would be defined by its relationship to guest image ABC as being a guest that is layer D added to guest image ABC. In order to update layer B to a new version B', while retaining the availability for use of guest images ABC and ABCD, guest images AB, ABC and ABCD will need to be rebuilt in the form of guest images AB', AB' C and AB' CD. While AB' and AB' C may be of no functional use as standalone guest images, because of the direct inheritance model, in order to build AB' CD, AB' and AB' C may be required to be built first. With a few dozen layers in each guest image, each of which may be required to be updated periodically, the resulting computational, buildout and storage requirements for creating guest images for an application quickly becomes an exponentially growing overhead. Take a simple example where an alternative guest image ABED is required, the three rebuilds to replace layer B with B' becomes five since AB'E and AB'ED both need to be built in addition to AB', AB' C and AB' CD. A replacement of a layer at the head of a branch with 100 variants, that each may have dozens of layers, would require all 100 of those variants to be rebuilt resulting in potentially thousands of rebuilds for just one layer replacement. Oftentimes security vulnerabilities may be exposed in lower level layers that require updates to fix, which presents administrators with a two fold problem, either incur greater overhead patching any and all layers with vulnerabilities as they arise, or risk potential security vulnerabilities.

To verify that a guest image is being built correctly, identifying signatures such as a hash for both a layer and its parent guest image are generally computed and compared to defined values from when the guest image was first created, and therefore any change to a guest image's foundation will cause all derivative guest images to recognize the change to their parents' hash and require a rebuild, even if the change was minor or inconsequential to the functioning of the child guest image, since even a minor one bit change will cause a hash to change. This creates a large fan out problem. Oftentimes the safest way to make sure that a critical change has been applied to a specific guest is to rebuild the guest with the critical change applied, creating significant administrative overhead for developers and administrators.

In addition, image files have a size that takes up space in a local memory device on the host node hosting the guest(s) instantiated from the image file, which fills up the local memory device's capacity. This in turn reduces the total compute capacity of the physical device hosting the guests. In a typical example, persistent storage devices may store data in devices such as hard drive disks ("HDD"), EEPROM devices (e.g., solid state drives ("SSD")), and/or persistent memory devices (e.g., Non-Volatile Dual In-Line Memory Modules ("NVDIMMs")). A typical storage unit may be additionally implemented with efficiency, security, and/or performance optimizations. In many storage units, additional features may be implemented for fault tolerance or redundancy purposes, for example, a Redundant Array of Independent Disks ("RAID") system may be implemented to provide high performance live backups of stored data. In an example, RAID systems may also be configured to increase read/write throughput on storage media. For example, storage capacity may be greatly enhanced through implementing compression and/or deduplication on a given storage device. Deduplication may be performed on many different levels, for example, on a block level, a file level, a file system level, or even a storage device level. Similarly, compression may typically be available on a block and/or a file level. A block may typically be a granular denomination of sequence of bits of physical storage in a fixed size that may be addressed and accessed on a storage device, e.g., 512 bytes, 4 kB, 8 kB, 16 kB, 32 kB, etc. In an example, the smaller the block sizes a storage device is divided into, the higher the density of data that can be stored on the device. For example, a 1 kB file may occupy an entire block regardless of how much empty space is left over in the block.

To illustrate deduplication and compression, in an example, an email server may receive an email message with a 1 MB attachment for an entire 1,000 employee company. Without deduplication, the attachment would be stored 1,000 times resulting in 1 GB of storage used. However, since the attachment is identical, with file level deduplication, only one copy actually needs to be stored with virtual links to that copy made to each recipient, resulting in a nearly 99.9% reduction in space usage for this example email message. A typical method of lossless or reversible data compression may entail encoding a file to represent repeated data with short form symbols. For example, "aaaaa" may be represented effectively as "5a" resulting in a 60% savings in space used. Similarly, repeated data may be given a symbol representation and therefore result in significant space savings. For example, a log file for user logins may repeatedly store lines similar to "[User1] successful login from [IP address]." In the example, "successful login from" may be compressed to a single character and therefore a single byte, therefore resulting in a 95% reduction in space from, for example, 21 bytes to 1 byte. In the email server example, if the 1 MB attachment is a text file, the addition of compression may further reduce the storage space taken by upwards of 90%, resulting in an overall 99.99% space savings. Compression and deduplication may be performed at different granularities, with corresponding performance penalties and efficiency advantages. Storage capacity optimizations may also include optimizations of metadata space and caching, for example, each file stored in a storage system requires a logical address to be accessed. A system storing many small files may therefore run out of addresses before it runs out of space, so increasing the size of the address pool (e.g., number of inodes, reducing block size) may allow more storage to be used. However, more addresses may require more seek time per access resulting in an overall performance penalty. Security optimizations may include features such as encryption and scrambling.

Compression and deduplication often come with significant performance penalties. In an example, compression or block level deduplication typically slows down file writes by 50-60%, even up to 90%. In addition, many file types may benefit very little from compression or very granular (e.g., block level) deduplication. For example, most commonly utilized storage formats for image and video data are already compressed, so additional compression may result in little to no space savings at the cost of significant latency. The drawbacks to compression and/or deduplication are often in the form of slower writes to storage media with these features enabled. However, for shared computing components such as dynamic or shared libraries, once the library is loaded into transient storage (e.g., DRAM) for high speed access, many applications in the same system may share the same copy of the shared resource, thereby greatly reducing access for those components without incurring the extra loading time from loading the resource from, for example, a hard disk, to DRAM.

The present disclosure significantly decreases the maintenance overhead attributable to maintaining up to date image files while also greatly reducing guest instantiation latency through component based dynamic guest installation. The inheritance model that image files are typically constructed with leads to significant maintenance overhead. While integrated image files present many advantages, for example, by packing all of an application's dependencies into an image file, a developer may be assured that the application may execute wherever the image file may be loaded, but maintaining image files becomes cumbersome in the face of security fixes and application updates. The cataloguing of dependencies and updating of guest image files for both feature enhancements and security fixes adds a significant maintenance overhead to containerized application deployment that reduces the overall efficiency gains achieved through virtualization.

Instead of instantiating guests from image files, in component based dynamic guest installation as described herein, each host is equipped with a centralized content store hosting numerous component files that are individual dependencies of applications that may be executed by the host (whether physical or virtual). Each application to be packaged to execute in a virtual guest is then mapped to all of its dependencies through metadata. Instead of transferring an image file from which a guest is launched to a host, the metadata manifest of components may be transmitted instead, greatly reducing network latency from guest instantiation. A metadata manifest may include references to all of the dependent components (e.g., files, libraries, drivers, etc.) that are necessary for a guest and any applications hosted on the guest to execute. A guest is launched based on a build order sent to instantiate a guest based on a metadata manifest. As many applications share core components (e.g., core shared libraries), on shared hosts these components will often already be loaded in DRAM and/or CPU cache, thereby speeding up execution when called upon by other applications and other guests on the same host. In environments hosting relatively homogenous applications, guests may be launched with little or no need for components outside of each host's content store. Metadata manifests may be configured to include a range of acceptable versions of each component (e.g., any version of component Z greater than version 1.6), and therefore new updates may be applied by pushing new versions (e.g., version 2.5 of component Z) to all of the content stores in the environment. Therefore, in a system executing component based dynamic guest installation, guest instantiation network latency may be greatly reduced, and guest density may be greatly increased on hosts, all while significantly reducing maintenance overhead and potential security risks to the system.

FIG. 1 is a block diagram of a component based dynamic guest instantiation system according to an example of the present disclosure. The system 100 may include one or more physical host(s) 110. Physical host 110 may in turn include one or more physical processor(s) (e.g., CPU 112) communicatively coupled to memory devices (e.g., MD 114A-B) and input/output device(s) (e.g., I/O 114). As used herein, physical processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refer to volatile or non-volatile memory devices, such as RAM, ROM, EEPROM, or any other device capable of storing data. As discussed herein, I/O device(s) 116 refer to devices capable of providing an interface between one or more processor pins and an external device, the operation of which is based on the processor inputting and/or outputting binary data. CPU(s) 112 may be interconnected using a variety of techniques, ranging from a point-to-point processor interconnect, to a system area network, such as an Ethernet-based network. Local connections within physical host 110, including the connections between processor 112 and a memory device 114A-B and between processor 112 and I/O device 116 may be provided by one or more local buses of suitable architecture, for example, peripheral component interconnect (PCI).

In an example, physical host 110 may run one or more isolated guests, for example, VM 122, and containers 172 and 174. In an example, any of containers 172 and 174 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, a given service may require the deployment of multiple containers and/or pods in multiple physical locations. In an example, VM 122 may be a VM executing on physical host 110. In an example, containers 172 and 174 may execute on VM 122. In an example, virtualization engine 140 and/or content store 160 may execute either independently or within a virtualized guest. In an example, any of containers 172 and 174 may be executing directly on either of physical host 110A without a virtualized layer in between. In an example, isolated guests may be further nested in other isolated guests. For example, VM 122 may host containers (e.g., containers 172 and 164). In addition, containers and/or VMs may further host other guests necessary to execute their configured roles (e.g., a nested hypervisor or nested containers). For example, a VM (e.g., VM 122) and/or a container (e.g., containers 172 or 174) may further host a Java® Virtual Machine ("JVM") if execution of Java® code is necessary.

System 100 may run one or more VMs (e.g., VM 122), by executing a software layer (e.g., hypervisor 120) above the hardware and below the VM 122, as schematically shown in FIG. 1. In an example, the hypervisor 180 may be components of respective host operating system 118 executed on physical host 110. In another example, the hypervisor 120 may be provided by an application running on operating system 118. In an example, hypervisor 120 may run directly on physical host 110 without an operating system beneath hypervisor 120. Hypervisor 120 may virtualize the physical layer, including processors, memory, and I/O devices, and present this virtualization to VM 122 as devices, including virtual central processing unit ("VCPU") 190, virtual memory devices ("VMD") 192, virtual input/output ("VI/O") device 194, and/or guest memory 195. In an example, a container may execute directly on host OSs 118 without an intervening layer of virtualization.

In an example, a VM 122 may be a virtual machine and may execute a guest operating system 196 which may utilize the underlying VCPU 190, VMD 192, and VI/O 194. One or more isolated guests (e.g., containers 172 and 174) may be running on VM 122 under the respective guest operating system 196. Processor virtualization may be implemented by the hypervisor 120 scheduling time slots on physical processors 112 such that from the guest operating system's perspective those time slots are scheduled on a virtual processor 190.

VM 122 may run on any type of dependent, independent, compatible, and/or incompatible applications on the underlying hardware and host operating system 118. In an example, containers 172 and 174 running on VM 122 may be dependent on the underlying hardware and/or host operating system 118. In another example, containers 172 and 174 running on VM 122 may be independent of the underlying hardware and/or host operating system 118. In an example, containers 172 and 174 running on VM 122 may be compatible with the underlying hardware and/or host operating system 118. Additionally, containers 172 and 174 running on VM 122 may be incompatible with the underlying hardware and/or OS. The hypervisor 120 may manage memory for the host operating system 118 as well as memory allocated to the VM 122 and guest operating system 196 such as guest memory 195 provided to guest OS 196.

In an example, any form of suitable network for enabling communications between computing devices, for example, a public network (e.g., the Internet), a private network (e.g., a local area network (LAN) or wide area network (WAN)), or a combination thereof may be employed to connect physical host 110, VM 122, and/or containers 172 and 174 to other computer systems. In an example, virtualization engine 140 may be a component responsible for instantiating guests on a host (e.g., containers 172 and 174 on VM 122. In an example, virtualization engine 140 may be interface with a virtualization orchestrator (e.g., Red Hat® OpenShift®, Kubernetes®) that may include additional subcomponents responsible for additional tasks. In an example, virtualization engine 140 and/or content store 160 may be implemented via any form of executable code (e.g., executable file, script, application, service, daemon, etc.).

In an example, content store 160 may be any form of suitable storage system for storing data and/or metadata appropriate, for example a relational database. The content store 160 may be stored in a database associated with a database management system ("DBMS"). A DBMS is a software application that facilitates interaction between the database and other components of the system 100. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, a relational database may be implemented with add-on packages and/or services for additional functionality and security (e.g., Red Hat Database®). In an example, content store 160 may be stored in a database organized as a formal database with a schema such as a relational schema with defined tables, indices, links, triggers, various commands etc. In some examples, content store 160 may not be organized as a formal database, but may instead be an alternative storage structure capable of holding the information stored in content store 160, including but not limited to a file, folder, directory, registry, array, list, etc.

In an example, content store 160 stores components 161A-B, 162A-B, 163, 164, 165A-B, 166, 167, 168, and 169. In the example, components 161A-B may be two different versions of a same component, similarly components 162A-B, and 165A-B may also be alternative versions of two other components. In an example, each of components 161A-B, 162A-B, 163, 164, 165A-B, 166, 167, 168, and 169 may be a logical subunit dependency of a guest system. For example, a component may be a shared library (e.g., libc), a computing platform (e.g., a software framework), a driver (e.g., network driver, I/O driver), even a configuration file. In an example, components 161A-B, 162A-B, 163, 164, 165A-B, 166, 167, 168, and 169 may be flagged as readable generally but may be write protected. In an example, one or more of components 161A-B, 162A-B, 163, 164, 165A-B, 166, 167, 168, and 169 may be loaded in DRAM on physical host 110 on a permanent or semi-permanent basis (e.g., flagged to be persistently in memory as a kernel component). In an example, components 161A-B, 162A-B, 163, 164, 165A-B, 166, 167, 168, and 169 may be stored in the form of files or any other suitable organizational structure. In an example, each of 161A-B, 162A-B, 163, 164, 165A-B, 166, 167, 168, and 169 may be identifiable via an identifying signature, for example, a hash value. In an example, component 161B may be an experimental or test version of component 161A that is not yet in production use. In an example, content store 160 may include additional metadata identifying which version of a given component (e.g., 161A-B, 162A-B, and/or 165A-B) will be defaulted to in the case that a version is not specified for a given container (e.g., containers 172 and 174). In an example, virtualization engine 140 may include resolution criteria for selecting a version of a component where multiple versions are acceptable.

In an example, virtualization engine 140 may receive application metadata 182 and 184 associated with containers 172 and 174 respectively. In the example, application metadata 182 may be part of a build order or instruction to virtualization engine 140 to instantiate a container 172 to execute application 177. In the example, application metadata 182 may include metadata references 131A, 152A, 133A, 134A, 138A, and 139A. In an example, metadata references 131A, 152A, 133A, 134A, 138A, and 139A may correspond to components 161A, 162B, 163, 164, 168, and 169. In the example, metadata reference 152A may denote that a version other than the default version of component 162A-B should be loaded in container 172. For example, component 162B may be a test version of a component whose default version is component 162A. In an alternative example, component 162B may be an older version of component 162A maintained for example, for backwards compatibility. In an example, metadata reference 131A instructs virtualization engine 140 to select a version of component 161A-B based on predefined resolution criteria (e.g., newest, newest production, testing, etc.) In an example, resolution criteria may be included with application metadata 182. In an example, application metadata 184 may be a manifest of components for container 174, which may in turn host application 178. In an example, references 151A, 132A, 133B, 135A, 136A, and 139B may correspond to components 161B, 162A, 163, 165A, 166, and 169 respectively.

In an example, file system 173 is a file system of container 172, hosted in VM 122 and constructed from the components referenced by application metadata 182. In the example, file system 173 may be dynamically constructed by virtualization engine 140 after receiving application metadata 182 with components (e.g., components 161A, 162B, 163, 164, 168, and 169) from content store 160. In an example, instead of an additional copy of components 161A, 162B, 163, 164, 168, and/or 169 being stored by VM 122, file system 173's contents may be populated with virtual links (e.g., component links 181A, 182B, 183X, 184, 188, and 189X) to the content store 160 components already resident in VM 122 (e.g., components 161A, 162B, 163, 164, 168, and 169). In an example, after key components are loaded to file system 173 (e.g., kernel components 161A and 162B), the remaining components in file system 173 may be lazily loaded after container 172 is launched. In an example, components 163, 164, 168, and/or 169 may be loaded only after application 177 on container 172 triggers a page fault trying to access them. In an example, container 174's file system 175 is similarly constructed from references 151A, 132A, 133B, 135A, 136A, and 139B and components 161B, 162A, 163, 165A, 166, and 169 in the form of component links 181B, 182A, 183Y, 185A, 186, and 189Y. In an example, applications 177 and 178 may be any form of executable code, binary, script, etc. In an example where container 172 is instantiated before container 174, a component, such as component 163 shared by both containers 172 and 174 may be updated in the interim. In such an example, container 174 may be instantiated with the updated version of component 163 while container 172 is still executing with the older version. In an example, container 172's older version of component 163 may stay in memory on VM 122 until the last legacy container referencing the older version is reaped after completing execution. In another example, previously executing containers (e.g., container 172) may be forced to reload the newly updated version of component 163. In an example, because containers 172 and 174 are constructed from comprehensive manifests (e.g., application metadata 182 and 184) referencing specific component files (e.g. components 161A-B, 162A-B, 163, 164, 165A-B, 166, 167, 168, and 169 in content store 160), each component may be independently swapped without inheritance from another component being impacted. In an example, components 161A-B, 162A-B, 163, 164, 165A-B, 166, 167, 168, and 169 may be write protected to prevent potential dependency issues where, for example, an owner of application 177 changes a shared component making it incompatible with application 178. In such an example, a specialized component may be loaded to content store 160 or may be included with application metadata 182 as part of application 177's specific data (e.g., with customizations such as graphical design elements).

Figure 2:
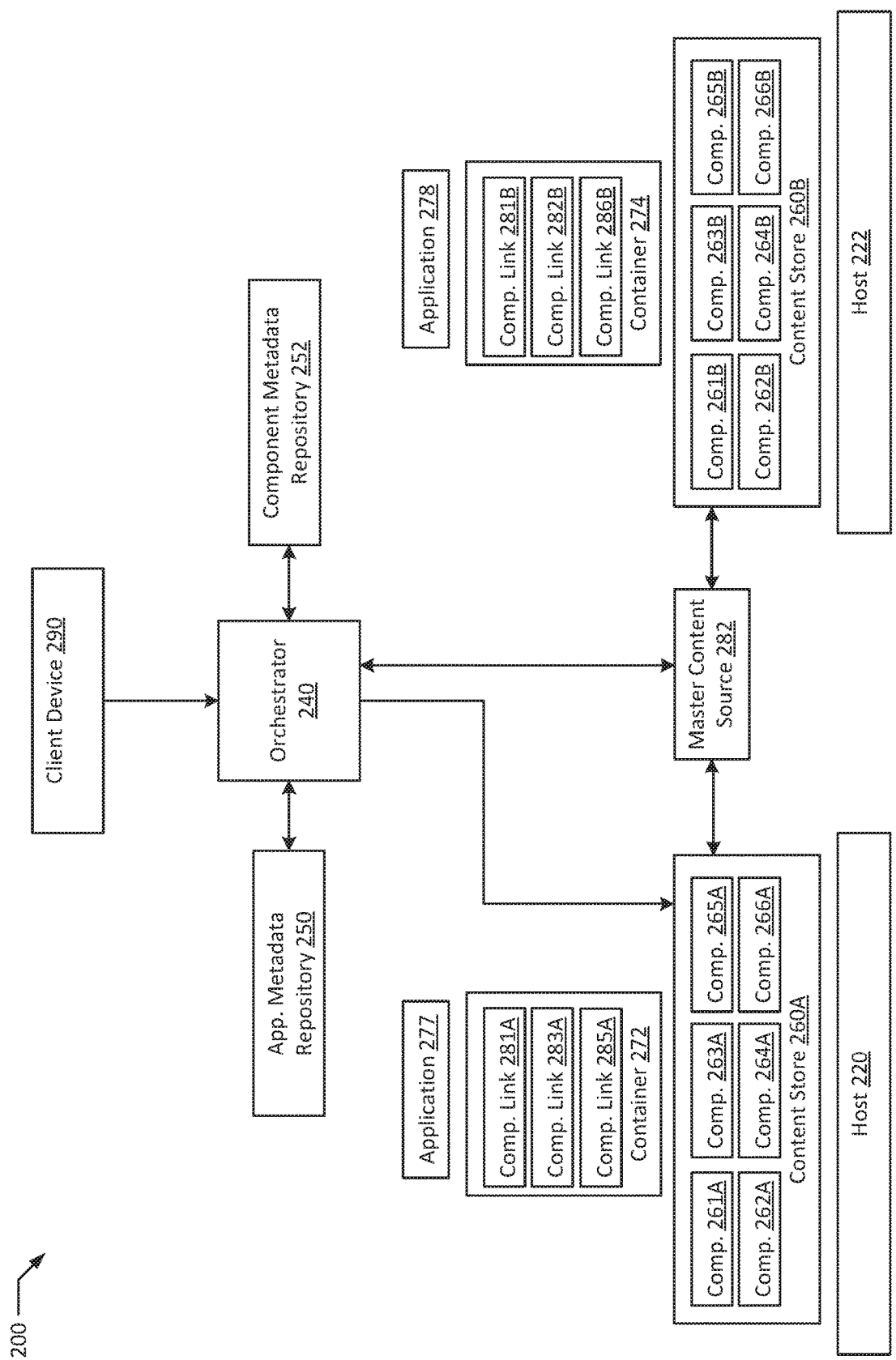
FIG. 2 is a block diagram illustrating an orchestrated component based dynamic guest instantiation system according to an example of the present disclosure.

FIG. 2 is a block diagram illustrating an orchestrated component based dynamic guest instantiation system according to an example of the present disclosure. In an example, illustrated system 200 may be a related system to illustrated system 100, with the addition of an orchestration layer focused on orchestrator 240. In an example, hosts 220 and 222 may be similarly configured physical and/or virtual hosts to physical host 110 or VM 122. In an example, host 220 hosts content store 260A with components 261A, 262A, 263A, 264A, 265A, and 266A. In an example, host 222 hosts content store 260B with identical copies of the components from content store 260A (e.g., 261B, 262B, 263B, 264B, 265B, and 266B). In an example, orchestrator 240 may be a guest orchestrator distributing computing tasks across a plurality of hosts (e.g., hosts 220 and 222) in a cloud environment, for example, Red Hat® OpenShift® or Kubernetes®. In an example, orchestrator 240 may be associated with application metadata repository 250 and/or component metadata repository 252. In an example, application metadata repository 250 and/or component metadata repository 252 may be implemented with any form of suitable storage structure as discussed with regards to content store 160 above, for example, a relational database. In an example, application metadata repository 250 may store metadata manifests for applications configured to be launched by orchestrator 240 (e.g., application metadata 182 and 184). In an example, component metadata repository 252 may store respective manifests of the current components in each content store (e.g., content stores 260A-B) on hosts 220 and 222 managed by orchestrator 240.

In an example, a client device 290 may be any form of network accessible device (e.g., phone, tablet, laptop, desktop, server, Internet of Things ("IOT") device, etc.) connected to system 200 through a network. In an example, client device 290 may have their own processors, memories, I/Os, and/or OS similar to hosts 220, 222. In an example, client device 290 accessing system 200 may connect to a network facing component such as a load balancer, which may be a component of orchestrator 240 for routing requests from client device 290 to appropriate hosts (e.g., hosts 220, 222) for handling the requests. In an example, a Domain Name Server ("DNS") may resolve an internet address into an Internet Protocol ("IP") address for orchestrator 240 or an associated web portal or load balancer. In an example, a user of client device 290 may log into an account to access services provided by orchestrator 240.

In an example, orchestrator 240 determines to send a request for application 277 from client device 290 to be executed by host 220, which then instantiates container 272 with component links 281A, 283A, and 285A to respective components 261A, 263A, and 265A in content store 260A. In an example, components 261A, 263A, and 265A are selected based on an application manifest retrieved from application metadata repository 250. Similarly, container 274 with component links 281B, 282B, and 286B to components 261B, 262B, and 266B is instantiated on host 222 to execute application 278. In an example, a master content source 282 includes a definitive source for components (e.g., components 261A-B to 266A-B) from which content stores 260A and 260B are populated and/or updated. In an example, content store updates may be scheduled periodically. In an example, content store updates may be forced (e.g., to patch a security issue). In some examples, master content source 282 may additionally include application specific data (e.g., user interface components such as images). In an example, applications 277 and/or 278 may be configured to connect to persistent storage devices to store stateful information during execution.

FIGS. 3A-D are a block diagrams illustrating lazy component loading in a component based dynamic guest instantiation system according to an example of the present disclosure. In illustrated system 300 depicted in FIG. 3A, a build order 350 includes application metadata 182. In an example, build order 350 may be based on a request from a client device (e.g., client device 290) by way of an orchestrator 240, potentially enriched through application metadata repository 250. In an example, build order 350 is a request to execute application 377, on a workload 360. In an example, virtualization engine 140 confirms that content store 160 stores the components referenced by build order 350 and application metadata manifest 382 (e.g., references 361A, 392A, 363A, 364A, 368A, and 369A corresponding to components 161A, 162B, 163, 164, 168, and 169). In an example, reference 361A may specify a range of acceptable versions of version of component 161A-B and allow virtualization engine 140 to select component 161A based on resolution criteria, reference 392A may specify a specific version of component 162A-B (e.g., 162B), and reference 364A may request any available version of component 164 (e.g., 164).

Figure 3:
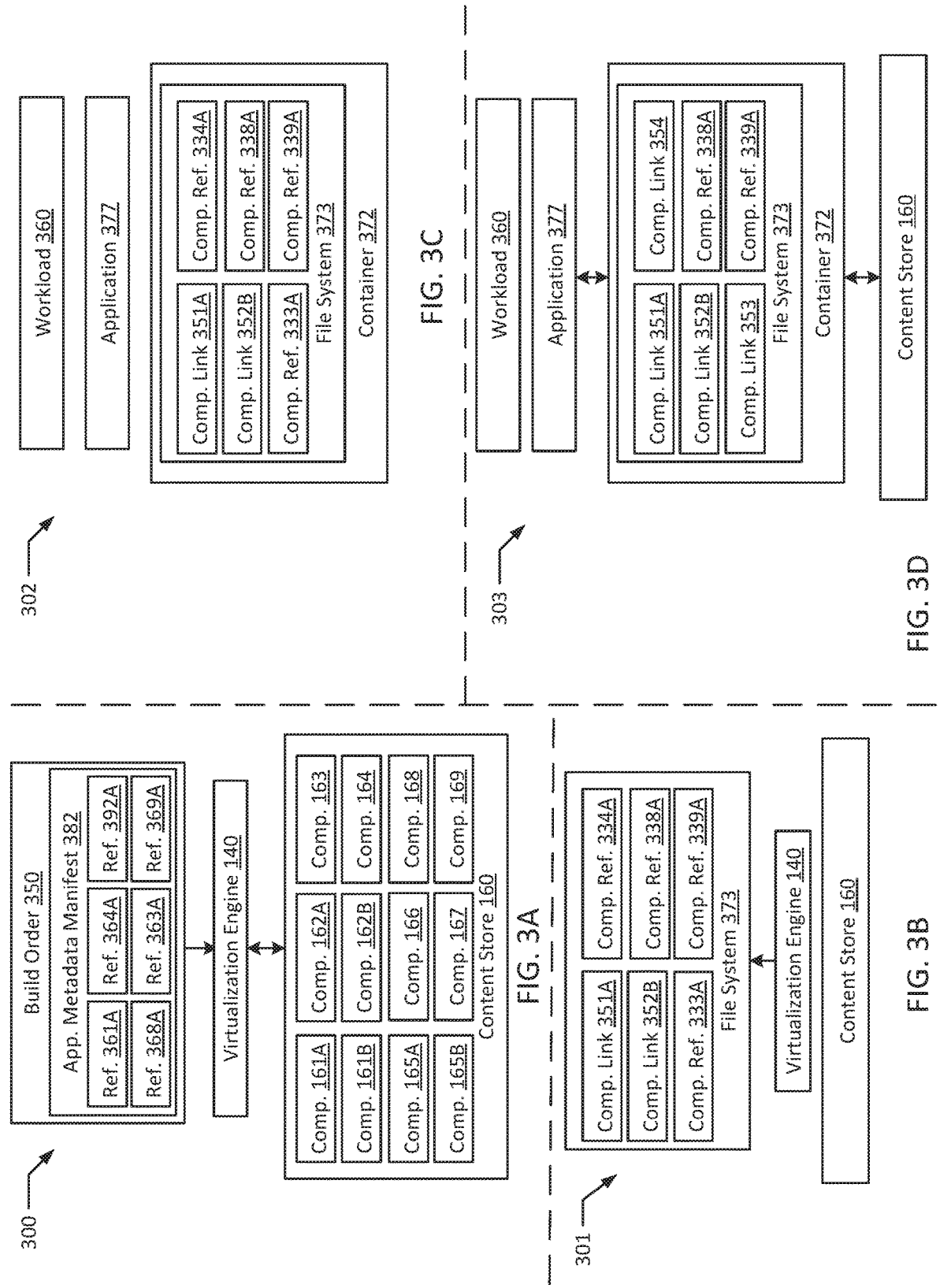
FIGS. 3A-D are a block diagrams illustrating lazy component loading in a component based dynamic guest instantiation system according to an example of the present disclosure.

Illustrated system 301 depicted in FIG. 3B may depict system 300 at a later point in time after virtualization engine 140 begins constructing file system 373 based on application metadata manifest 382. In an example, file system 373 will become the file system of container 372. In the example, core system components, for example, kernel components or application runtime components (e.g., components 161A and 162B), are loaded into file system 373 first. In the example, components 161A and 162B are linked to file system 373 via component links 351A and 352B to copies of components 161A and 162B respectively. In an example, copies of components 161A and 162B from content store 160 may reside in guest memory 195, virtual memory device 192, and/or memory devices 114A-B. In an example, component links 181A and 182B allow container 372 to access components 161A and 162B as if they were installed directly in file system 373 without incurring extra storage overhead. In some examples, additional copies of components may be made in a guest file system (e.g., file system 373), for example, if deduplication is not enabled for performance reasons.

Illustrated system 302 depicted in FIG. 3C may depict system 301 at a later point in time after a requisite set of components for instantiating container 372 have been loaded to file system 373. In an example, once component links 351A and 352B are established in file system 373, container 372 may be instantiated. In the example, after instantiation, workload 360 may be loaded to container 372. In an example, workload 360 may be an input into application 377, for example, a raw video file to be encoded by application 377. In some examples, workload 360 may be transferred to temporary storage scratch space associated with container 372. In other examples, a persistent storage space containing workload 360 may be mounted to file system 373 thereby granting access to workload 360 to container 372. In an example, application 377 may be a separate executable code loaded or mounted to container 372. In another example, application 377 may be assembled as part of container 372 from components in content store 160. In an example, application 377 may launch with only component links 351A and 352B established, while component references 333A, 334A, 338A, and 339A may be references similar to metadata references 363A, 364A, 368A, and 369A. In an example, metadata references 363A, 364A, 368A, and 369A may be added to filesystem 373 for linking to be completed after container 372 is launched when VM 122 has excess compute capacity.

Illustrated system 303 depicted in FIG. 3D may depict system 302 at a later point in time after application 377 attempts to access components 163 and 164 referenced by component references 333A and 334A. In an example, accessing components 163 and 164 may trigger memory faults (e.g., a page fault), for example, on hypervisor 120. In an example, another module of VM 122 and/or physical host 110 may flag the absence of component links when component references 333A and/or 334A is accessed by application 377 or container #72. In an example, component links 353 and 354 are established in response to the memory fault, thereby allowing application 377 access to components 163 and 164. In an example, additional component links may be made based on component references 338A and/or 339A based on compute resources of VM 122 falling under a certain threshold utilization rate, thereby utilizing the resulting spare computing cycles to complete the instantiation of container 372.

Figure 4:
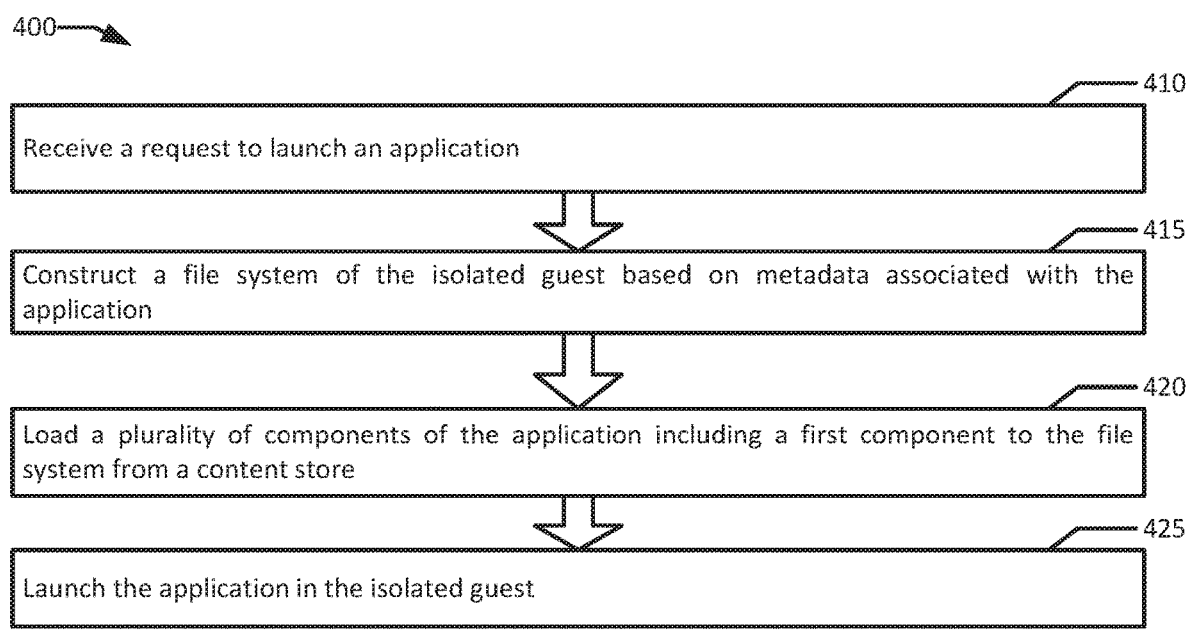
FIG. 4 is a flowchart illustrating an example of component based dynamic guest instantiation according to an example of the present disclosure.

FIG. 4 is a flowchart illustrating an example of component based dynamic guest instantiation according to an example of the present disclosure. FIG. 4 is a flowchart illustrating an example of image subunit based guest scheduling according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by a virtualization engine 140.

Example method 400 may begin with receiving a request to launch an application (block 410). In an example, the application is configured to execute in a guest. In an example, virtualization engine 140 receives a request including application metadata 182 to launch application 177, which executes in container 172. In some examples, an orchestrator may assign application 177 to execute on VM 122. For example, VM 122 may be selected based on content store 160 including a plurality of components of application 177 and/or container 172 hosting application 177 (e.g., components 161A, 162B, 163, 164, 168, and 169). In some examples, a component of container 172 and/or application 177 may be added to content store 160 after application 177 is assigned to execute on VM 122. For example, a missing component may be transferred to content store 160 where VM 122 is nevertheless selected to host application 177 even though content store 160 is missing components. In the example, VM 122 may be a best match for having the proper components in its content store 160 while also having sufficient additional capacity to host container 172. In another example, a workload (e.g., data to be processed) and/or a application 177 or container 172 specific component (e.g., branding material, host specific configuration settings for network security, etc.). For example, application 177 may be part of a video hosting website, and application 177 maybe responsible for encoding videos. In such an example, a workload may be a video being encoded which may not be a reusable component and therefore may not be added to content store 160. In an example, each of components 161A-B, 162A-B, 163, 164, 165A-B, 166, 167, 168, and 169 may be any logically separable unit (e.g., a file) identifiable by a unique (e.g., to system 100) identifier (e.g., a hash value, a file name, etc.) that may be referenced during the execution of a guest (e.g., containers 172, 174) executing on VM 122.

A first file system of the first isolated guest is constructed based on first metadata associated with the first application (block 415). In an example, virtualization engine 140 constructs file system 173 based on application metadata 182 associated with application 177. For example, file system 173 may be any form of suitable organizational structure for logically storing the components of container 172, such as a hierarchical folder based file structure. In an example, application metadata 182 may identify multiple acceptable versions of a given component. For example, component reference 131A may refer to a core system library (e.g., libc++ allowing the execution of C++ code). In the example, component reference 131A may refer in general to libc++ without specifying any specific version, while content store 160 may include components 161A-B which may be two different versions of libc++. In an example, resolution criteria may be implemented at an orchestrator level, a virtualization engine 140 level, a content store 160 level, as part of application metadata 182 or a build order containing application metadata 182, or in any other suitable level for determining which version of libc++ to include with container 172. For example, a system administrator may install a new version of a component (e.g., component 161B) that is not production ready, for users of system 100 to test with. In such an example, component 161B may be flagged to be ignored by production applications and/or containers (e.g., application 177, container 172). Therefore, component 161A may be selected. Alternatively, application metadata 182 may specify that any version of libc++ exceeding a certain baseline version number is acceptable, but may caveat to only use a production component. In a different example, a test version of a component may be flagged to be used, for example, to ensure compatibility with a new component (e.g., a security patched component). In an example where a deprecated or legacy feature is required, a maximum acceptable version number may also be specified for a given component.

A first plurality of components of the first application including a first component are loaded to the first file system from a content store (block 420). In an example, the first component is defined in the first metadata. For example, virtualization engine loads components 161A, 162B, 163, 165, 168, and 169 to file system 173 from content store 160 as defined by application metadata 182 (and any applicable resolution criteria where multiple versions of a given component are available to select from). In an example, content store 160 stores components that may be shared between many applications. In some examples, even application specific components may be stored in content store 160, for example, where many instances of the given application are expected to be executed. In an example, components 161A-B, 162A-B, 163, 164, 165A-B, 166, 167, 168, and 169 in content store 160 may be periodically updated. In some examples, updating one of components 161A-B, 162A-B, 163, 164, 165A-B, 166, 167, 168, and 169 in content store 160 may be performed while an application is still executing on VM 122. For example, application 178 may be using component 163 (e.g., via component link 183Y) while component 163 is updated. In the example, when another container (e.g., container 172) utilizing component 163 is later instantiated (e.g., while application 178 is still executing), container 172 may automatically load the new, updated version of component 163. For example, the new version may become the default selected via resolution criteria implemented on virtualization engine 140 (e.g., pick the newest acceptable version available). In an example, where the new version of component 163 has not yet been loaded to high performance storage (e.g., DRAM) from slower storage (e.g., hard disk), instantiating container 172 may cause a copy of the new version of component 163 to be loaded to DRAM on physical host 110. This loading may be triggered, for example, by a page fault resulting from container 172 attempting to access the new version of component 163. In an example, the identifier of each of components 161A-B, 162A-B, 163, 164, 165A-B, 166, 167, 168, and 169 may also include a respective version of the identified component. For example, a version of a component (e.g., components 161A-B, 162A-B, 163, 164, 165A-B, 166, 167, 168, or 169) may be immediately apparent (e.g., implemented as part of a file name), or may require reviewing metadata associated with a given component.

In an example, rather than each guest (e.g., containers 172 and 174) having a separate copy of each component loaded into memory on VM 122 and/or physical host 110, one copy of a given component may be stored in memory devices 114A-B, and each guest or other reference to the component may be implemented via a virtual link to that copy, for example, via different page table entries pointing to the same physical memory address. In an example, hypervisor 120 may coordinate the proper memory mapping of individual guests. In an example, application metadata 182 includes a comprehensive manifest of each of the components required by container 172 and/or application 177 to execute. In the example, content store 160 may include a copy of an acceptable version of each of the components referenced by application metadata 182 (e.g., components 161A, 162B, 163, 164, 168, and 169 referenced by references 131A, 152A, 133A, 134A, 138A, and 139).

The first application is launched in the first isolated guest (block 425). In an example, once sufficient component links (e.g., component links 181A and 182B) have been established in file system 173 for container 172 to be instantiated, container 172 may be booted up on VM 122. In the example, other component links (e.g., component links 183X, 184, 188, and 189X) may be lazily established when needed (or when spare processing cycles are available). In the example, application 177 may first be launched in container 172, and component link 183X may be established only when application 177 requests component 163 triggering a memory access fault or error when component 163 cannot be located in file system 173. In an example, VM 122 and/or hypervisor 120 may handle the memory fault by establishing component link 183X to a copy of component 163 already loaded to memory. In some examples, permissioning (e.g., read permissions) settings on the in memory copy of component 163 may preclude access by container 172 until component link 183X is successfully established.

In an example, two applications with very different front end interfaces (e.g., a video hosting site and a web email site) may actually execute on a very similar set of shared libraries and other components. In the example, each application may be linked to a respective external data store for application specific features (e.g., branding and logos, inventory information and mail storage, etc.) without requiring those features to be available on local storage for the guests hosting the applications. These features may be preloaded to preprovisioned persistent storage nodes that may be mounted to guests to quickly grant access to the application specific features. In an example, both the video hosting site and the web email site may require executing C++ code, and may therefore both require a copy of libc++. In order to ensure that their code executes smoothly, rather than default to whatever version of libc++ is installed in guest OS 196, application metadata for each site's application (e.g., application metadata 182 and 184) may reference specific acceptable versions of the library.

Figure 5:
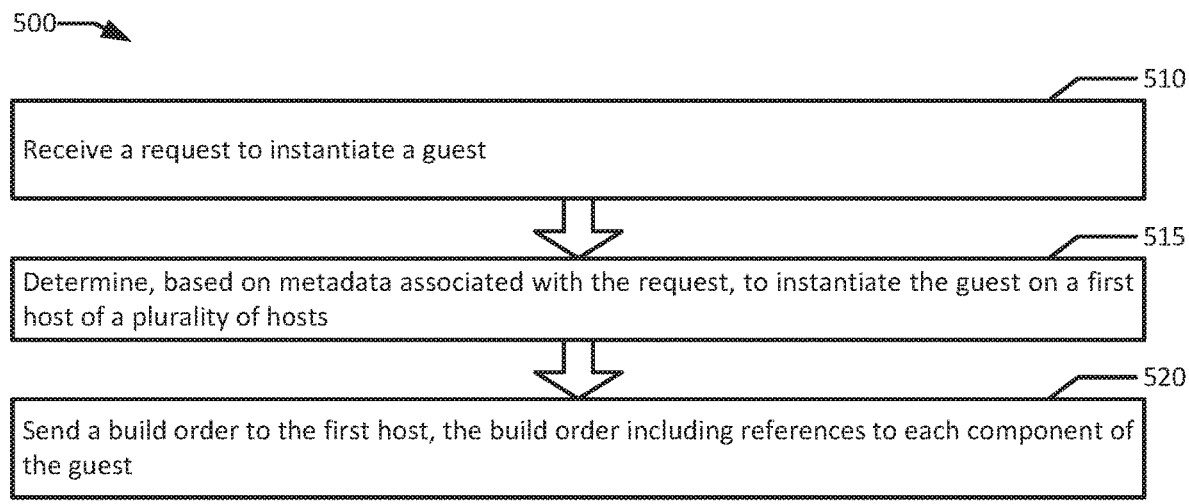
FIG. 5 is a flowchart illustrating an example of orchestrated component based dynamic guest instantiation according to an example of the present disclosure.

FIG. 5 is a flowchart illustrating an example of orchestrated component based dynamic guest instantiation according to an example of the present disclosure. FIG. 5 is a flowchart illustrating an example of image subunit based guest scheduling according to an example of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example, the method 500 is performed by an orchestrator 240.

A first request is received to instantiate a guest (block 510). In an example, the guest is configured to execute a particular application. For example, orchestrator 240 receives a request from client device 290 to instantiate container 272 to execute application 277. In an example, client device 290 may be an administrator starting up additional capacity for a computing service (e.g., a website). In another example, client device 290 may be an end user submitting a workload to be processed by a web service, for example, a user uploading a video from their mobile phone to a social media site.

The orchestrator 240 determines, based on first metadata associated with the request, to instantiate the guest on the first host of a plurality of hosts (block 515). In an example, the plurality of hosts includes a first host with a first content store storing a first plurality of components and a second host with a second content store storing a second plurality of components. For example, orchestrator 240 may query component metadata repository 252 to compare the current contents of content stores (e.g., content stores 260A-B) on various hosts (e.g., hosts 220, 222) managed by orchestrator 240. In an example, the orchestrator 240 may schedule container 272 to be instantiated on host 220 based on application metadata for application 277, which may contain an accurate manifest of the components required by application 277 and its parent container 272 to execute. In an example, the application metadata is received from client device 290. In another example, application metadata is retrieved from application metadata repository 250. In an example, default or template metadata manifests may be created that provide basic platforms upon which application specific containers may be constructed. These templates may also be saved in application metadata repository 250.

In various examples, an accurate component manifest is crucial to the successful execution of applications because a missing or incompatible component may result in an unrecoverable fatal error for the application. In an example, application metadata may be constructed by the developers working on the application's source code. Utilities and toolchains may be employed that are configured with the interdependencies of each integrated component to ensure that all dependencies are referenced in the application metadata. In many examples, even if a given application has a large list of dependent components, the vast majority of these components may already be loaded in memory from the content store on a given host hosting a few hundred containers. Therefore the incremental startup cost is very small for a new container. In some examples, a utility such as a debugger or test suite add-on may be employed to trigger the various functions in an application in order to ensure that all dependencies are mapped. For example, the debugger may track the memory accessed by the application being tested to ensure that the components being added are in the application's manifest, and may be additionally configured to automatically add missing references. In an example, a mapping module may be incorporated in a toolchain for constructing executable files from the source code of an application which may generate a component manifest as part of the build process for the application. In an example, the component manifest may be validated, in part, via executing a test suite on the application and tracking the components in memory referenced by the application while executing the test suite. In some examples, a host (e.g., VM 122, hosts 220, 222), virtualization engine (e.g., virtualization engine 140), hypervisor (e.g., hypervisor 120) and/or other memory manager may be configured to attempt to assist a container recover from a memory error caused by a deficient manifest. For example, if a component invoked by the application 177 is present in content store 160 but absent from application 177's metadata manifest (e.g., component 166), instead of generating a fatal error, the component may be virtually linked to file system 173 and made available to container 172 by hypervisor 120 provided that proper permissions and authorizations to access component 166 are in place. In an example, a super user or administrator override may be required to load components outside of an application's metadata manifest.

In an example, content stores 260A-B are regularly and/or periodically updated from master content source 282. In the example, master content source 282 may be a centralized storage of components authorized to be integrated in system 200 managed by orchestrator 240. In an example, master content source 282 may be updated based on the latest official updates from various software providers for their respective components. In some examples, software packages from a given provider may be deconstructed to smaller subunits to avoid overhead from loading more of a given component dependency than necessary on a hosting environment. For example, components such as video card drivers and printer drivers may often be safely excluded from a webserver hosting environment. In some examples, certain components that present vectors for security breaches and/or unauthorized access may also be restricted from being loaded to content stores. For example, low security networking protocols like telnet or software installation utilities like yum may be kept out of content stores to reduce the chance of unauthorized access (e.g., by a developer adding these features to an application component manifest. In an example, master content source 282 and/or content stores 260A-B may be scanned for malicious code. In an example, content stores 260A-B may be synchronized to master content source 282 during a scheduled update. In some examples, application or user group specific components added to a content store may be retained even after a resync with master content source 282. In an example, after both content stores 260A and B are updated, their contents are identical to each other. In an example, content store 260A may be updated while application 277 is executing.

A build order is sent to the first host, the build order including references to each component of the first guest (block 520). In an example, the first guest is instantiated on the first host with a subset of the first plurality of components. For example, orchestrator 240 sends a build order to host 220 with references to components 261A, 262A, and 265A to host 220. In the example, container 272 may be ready to launch with only components 261A and 262A loaded, for example, if component 265A is a dependency of application 277 and not of container 272. In an example, container 272 is launched before all of the components referenced in the build order are loaded to container 272's file system. In an example, component 265A may be loaded to container 272 via component link 285A after application 277 begins executing. In some examples, multiple acceptable versions of a given component may be available in content store 260A, and selection criteria may be employed to associate and/or link an appropriate version of a given component to container 272.

In an example, a build order may be associated with additional data files. For example, application 277 may depend on an application, account, or host specific component that is added to content store 260A when the build order is sent by orchestrator 240 to host 220. An application may have an application specific graphical or sound library that may not be loaded to every content store in an environment, for example, for memory efficiency reasons. In an example, a user account of client device 290 may include account specific logos and other branding information that may have limited share-ability with other users of system 200, and may therefore only be loaded to content stores where the user account has active guests. In an example, certain networking security mechanisms such as firewalls may require host specific configuration settings that may deviate from host to host or guest to guest. In an example, a workload may be transferred as a data file associated with a build order. In the video hosting example, a workload may be a new video file uploaded for encoding to be hosted. Application 277 may perform this encoding and/or scan the video file for copyrighted content etc.

In an example, application 278 may be instantiated on host 222 based on differences between the contents of content store 260B and content store 260A. In an example, content stores 260A and 260B may have a synchronized set of core components received from master content source 282. In the example, the component contents of content store 260A and 260B may potentially drift apart due to application, client, or host specific components additionally stored in content stores 260A and 260B respectively. In an example, application 278 may be assigned to and instantiated on host 222 based on an account specific component in content store 260B identified by orchestrator 240 via component metadata repository 252.

Figure 6:
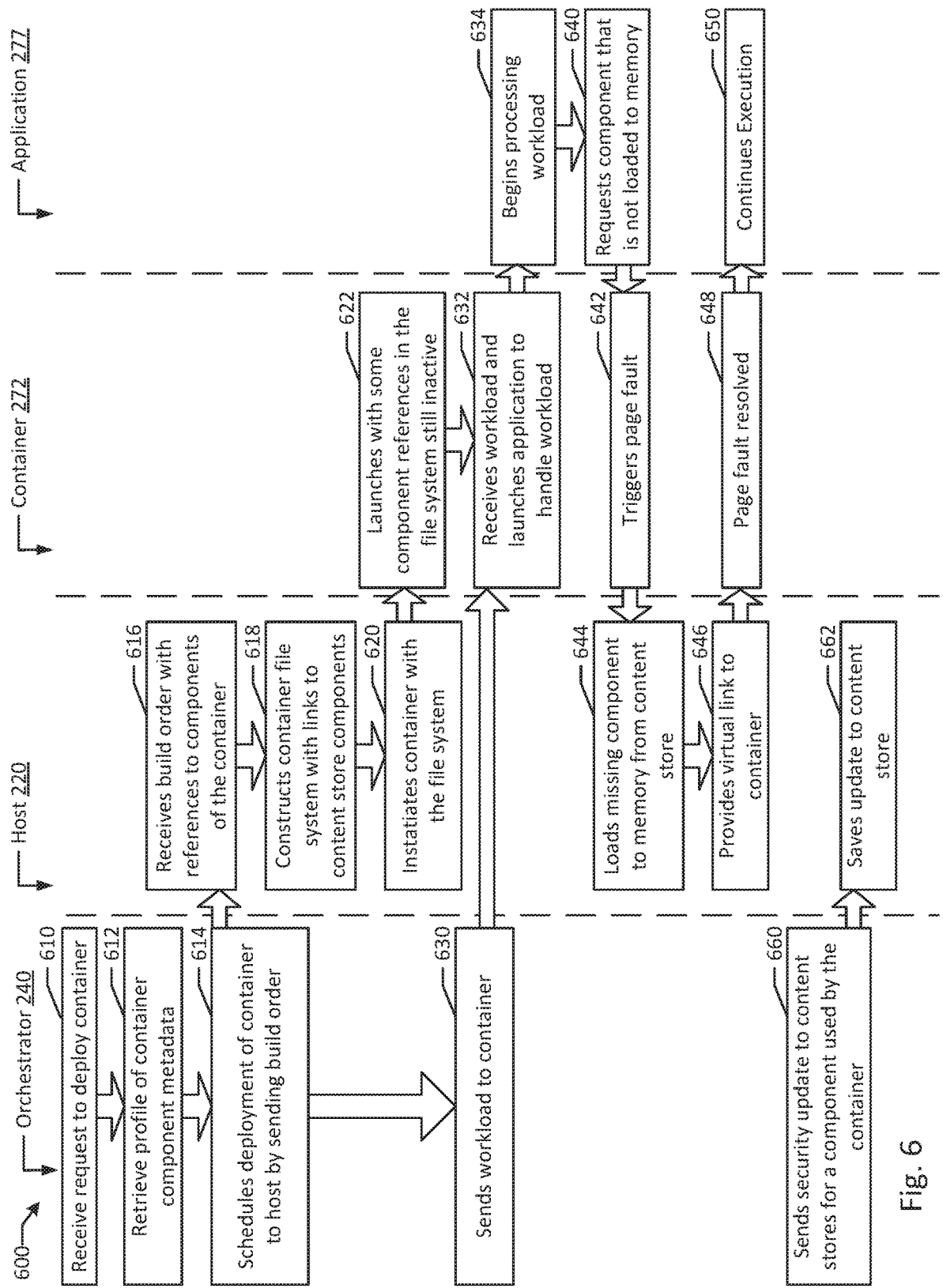
FIG. 6 is flow diagram of an example of orchestrated component based dynamic guest instantiation according to an example of the present disclosure.

FIG. 6 is flow diagram of an example of orchestrated component based dynamic guest instantiation according to an example of the present disclosure. Although the examples below are described with reference to the flowchart illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, orchestrator 240, host 220, container 272, and application 277 execute component based dynamic guest instantiation.

In example system 600, orchestrator 240 receives a request to deploy container 272, for example, to execute application 277 on a newly uploaded video file (block 610). In the example, the request may be uploaded from a user device such as a smart phone or tablet. In an example, orchestrator 240 retrieves a container component metadata profile for container 272 from application metadata repository 250 (block 612). For example, container 272's associated metadata may include references to components 261A, 263A, and 265A. In an example, component 261A may be a platform or kernel component of container 272 required to boot up container 272. In the example, component 263A may be a programming language library (e.g., libc, libc++, java class library, etc.) required for application 277 to be launched. In the example, component 265A may be a component dependency of application 277 required to perform its functionality on a workload (e.g., raw video file) such as a video codec. In an example, orchestrator 240 schedules deployment of container 272 to host 220 by sending a build order to host 220 with an associated component manifest of container 272 (block 614). In an example, orchestrator 240 determines that content store 260A on host 220 has all of components 261A, 263A, and 265A available based on querying component metadata repository 252. In an alternative example, orchestrator 240 may determine, for example, based on querying component metadata repository 252, that none of the hosts in system 200 with a content store that includes all of the components of container 272 has computing capacity to host a new instance of container 272. In an example, orchestrator 240 may determine that content store 260A includes a subset of the components in container 272's metadata manifest. In the example, one or more components is pushed to content store 260A (e.g., by orchestrator 240 or master content source 282) and/or retrieved by content store 260A in conjunction with the build order. For example, an application or client specific component may be added to content store 260A, which may cause orchestrator 240 to preferentially assign further applications of the same user or client to host 220 to leverage the component in content store 260A.

In an example, host 220 receives a build order with references to components 261A, 263A, and 265A of container 272 (block 616). In the example, host 220 constructs a file system of container 272 by establishing links from the file system to content store 260A components 261A, 263A, and/or 265A (block 618). In an example, host 220 instantiates container 272 with the constructed filesystem (block 620). In the example, container 272 may be instantiated before all of components 261A, 263A, and 265A are linked to the file system of container 272, for example, components 263A and/or 265A may not be necessary for container 272 to boot up, and therefore startup latency may be reduced by launching container 272 as soon as component 261A is loaded to the file system (block 622).

In an example, orchestrator 240 may be notified that container 272 has been instantiated and thereafter orchestrator 240 may send the workload (e.g., raw video file) to container 272 (block 630). In certain examples, orchestrator 240 may request a persistent storage volume to store the raw video file while container 272 is being instantiated, and may send container 272 instructions on mounting the persistent storage volume with the workload file to allow more processing to occur in parallel, thereby reducing latency. In an example, container 272 receives the workload and launches application 277 to handle the workload (block 632). In an example, application 277 may be launched only after component 263A has been properly loaded and/or linked to container 272's file system. In an example, application 277 begins processing the workload (block 634). In the example, to process the workload, application 277 requires access to the appropriate codec for encoding the video file, which is not currently loaded to memory on host 220 (block 640).

In the example, application 277's request triggers a page fault on container 272 (block 642). In an example the page fault may be triggered on a hypervisor under a virtual host 220 and/or a memory management unit on the physical processor underlying host 220. In an example, host 220 loads the missing component 265A to DRAM from content store 260A (block 644). In the example content store 260A is a persistent storage volume (e.g., HDD, RAID, SSD, NVDIMM, etc.). In some examples, content store 260A may be persisted in DRAM and no additional loading to DRAM is needed. In an example, host 220 provides a virtual link to component 265A to container 272 (block 646). In the example, container 272 detects that the page fault is resolved and makes component 265A available to application 277 (block 648). In the example, application 277 continues execution (block 650).

In an example, while application 277 is executing to encode the video file, orchestrator 240 receives a security update for component 261A (block 660). In the example, the security updated version of component 261A may be sent to master content source 282. In an example the security updated version of component 261A may be sent to content store 260A on host 220 to be saved (block 662). In an example, while container 272 is executing it uses the non-updated version of component 261A resident in memory on host 220. In the example, a new container launched to encode a second video file may be instantiated with the newly updated version of component 261A while application 277 is still executing.

Figure 7:
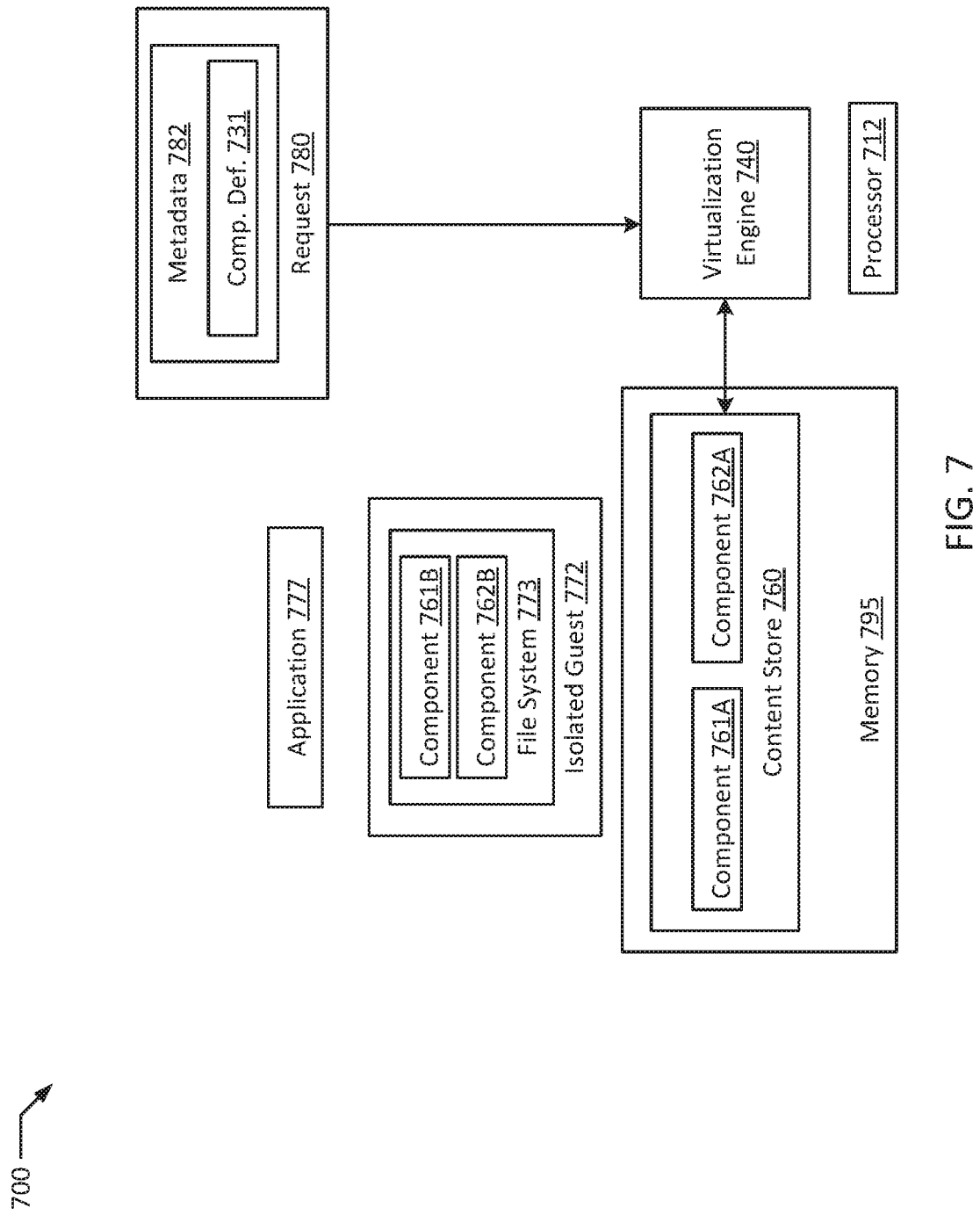
FIG. 7 is a block diagram of an example component based dynamic guest instantiation system according to an example of the present disclosure.

FIG. 7 is a block diagram of an example component based dynamic guest instantiation system according to an example of the present disclosure. Example system 700 includes memory 795 storing content store 760, and virtualization engine 740 executing processor 712 to receive request 780 to launch application 777 configured to execute in isolated guest 772. File system 773 of isolated guest 772 is constructed based on metadata 782 associated with application 777. Components 761A and 762A of application 777 are loaded (as components 761B and 762B) to file system 773 from content store 760, where component 761A is defined in metadata 782 (e.g., as component definition 731). Application 777 is launched in isolated guest 772.

Figure 8:
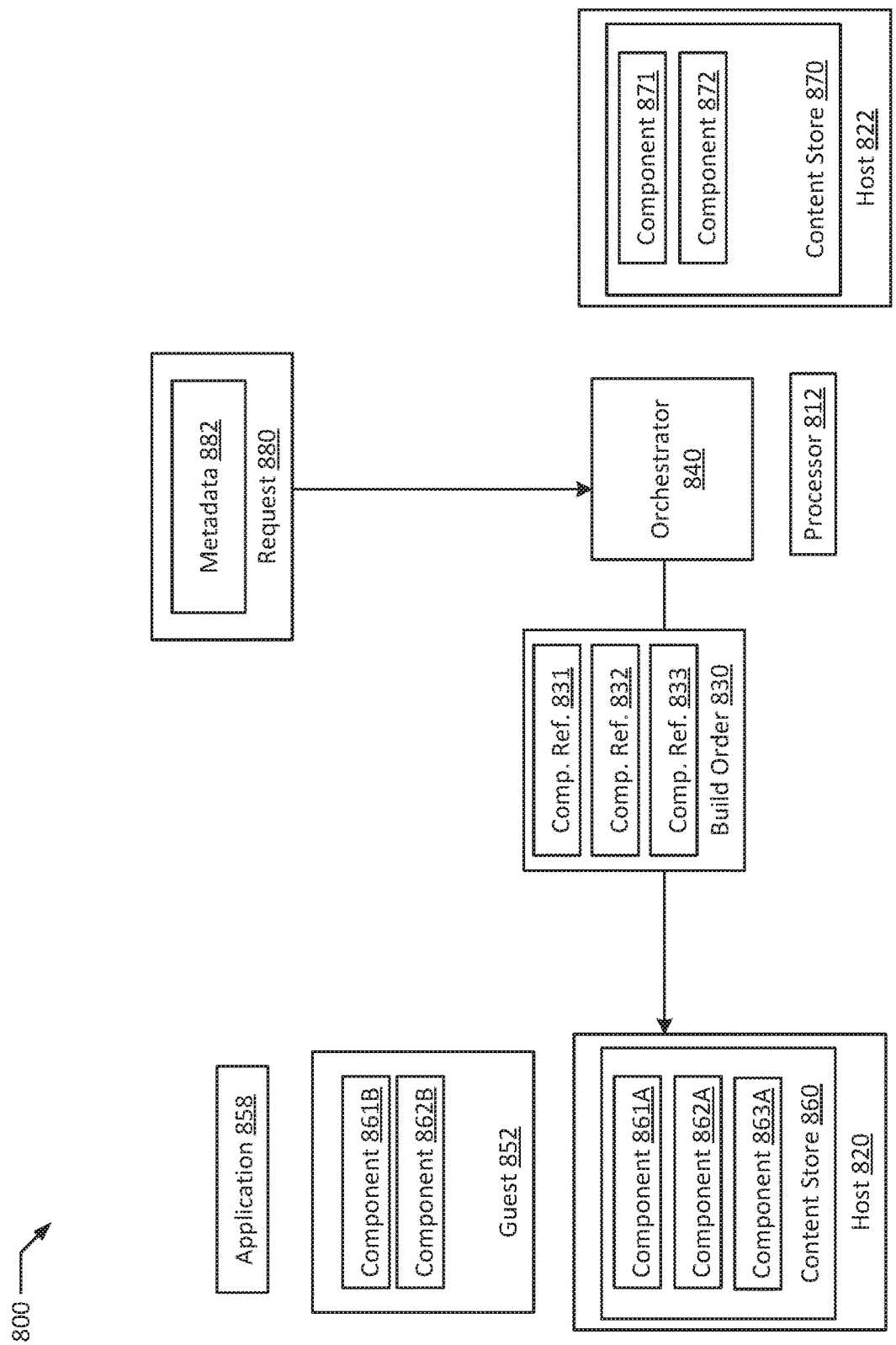
FIG. 8 is a block diagram of an example orchestrated component based dynamic guest instantiation system according to an example of the present disclosure.

FIG. 8 is a block diagram of an example orchestrated component based dynamic guest instantiation system according to an example of the present disclosure. Example system 800 includes a host 820 with content store 860 storing components 861A, 862A, and 863A, and host 822 with content store 870 storing components 871 and 872. Orchestrator 840 executes on processor 812 to receive request 880 to instantiate guest 852 configured to execute application 858. Orchestrator 840 determines, based on metadata 882 associated with request 880 to instantiate guest 852 on host 820. Build order 830 is sent to host 820, where build order 830 includes component reference 831, 832, and 833 to components 861A, 862A, and 863A of guest 852, where guest 852 is instantiated on host 820 with a subset (e.g., components 861B and 862B) of components 861A, 862A, and 863A.

Component based dynamic guest instantiation greatly decreases guest instantiation latency in large shared computing environments, while reducing guest management overhead by eliminating the need for image files, and improving computer security by allowing security updates to be pushed out to a system more quickly and seamlessly. It also significantly reduces the chances of containers missing security updates due to mismanaged dependency structures, for example, where an administrator does not realize that a vulnerable component was incorporated in a layer of an image file of a specific container. Guests may be instantiated with little to no network transfer of guest components since content stores may be maintained independently of guest instantiation requests, so networking delays to transfer image files in the hundreds of megabytes to gigabytes may be replaced with transferring a build order with a metadata component manifest that may be under one megabyte. Accordingly, guest instantiation as described herein may greatly reduce network bandwidth requirements and improve latency, while also advantageously decreasing security risks.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a memory storing a content store; and a virtualization engine executing on one or more processors to: receive a request to launch a first application, wherein the first application is configured to execute in a first isolated guest; construct a first file system of the first isolated guest based on first metadata associated with the first application; load a first plurality of components of the first application including a first component to the first file system from the content store, wherein the first component is defined in the first metadata; and launch the first application in the first isolated guest.

In accordance with a 2nd exemplary aspect of the present disclosure, which may be used in combination with any one or more of the preceding aspects (e.g., the 1st aspect), wherein the content store includes a plurality of components of a plurality of applications including the first application, and wherein each respective component of each of the respective applications of the plurality of applications is included in the content store. In accordance with a 3rd exemplary aspect of the present disclosure, which may be used in combination with any one or more of the preceding aspects (e.g., the 2nd aspect), wherein the plurality of components is periodically updated, and at least one application executes on at least one isolated guest on the system while the plurality of components is updated. In accordance with a 4th exemplary aspect of the present disclosure, which may be used in combination with any one or more of the preceding aspects (e.g., the 2nd aspect), wherein each component of the plurality of components is associated with a respective identifier, and wherein the respective identifier includes a version of the respective component.

In accordance with a 5th exemplary aspect of the present disclosure, which may be used in combination with any one or more of the preceding aspects (e.g., the 1st aspect), wherein a second component of the first plurality of components is loaded to the first file system after the first application begins execution. In accordance with a 6th exemplary aspect of the present disclosure, which may be used in combination with any one or more of the preceding aspects (e.g., the 5th aspect), wherein the second component is loaded in response to a memory access fault.

In accordance with a 7th exemplary aspect of the present disclosure, which may be used in combination with any one or more of the preceding aspects (e.g., the 1st aspect), wherein the first component in the content store is updated to a new version of the first component. In accordance with a 8th exemplary aspect of the present disclosure, which may be used in combination with any one or more of the preceding aspects (e.g., the 7th aspect), wherein a second application associated with second metadata and a second plurality of components is launched in a second isolated guest while the first application is executing, and the second application executes with the new version of the first component.

In accordance with a 9th exemplary aspect of the present disclosure, which may be used in combination with any one or more of the preceding aspects (e.g., the 1st aspect), wherein loading the first component is achieved though a virtual link to an existing copy of the first component in the memory. In accordance with a 10th exemplary aspect of the present disclosure, which may be used in combination with any one or more of the preceding aspects (e.g., the 1st aspect), wherein the first metadata includes a plurality of references to each of a plurality of components of the first application including the first component. In accordance with a 11th exemplary aspect of the present disclosure, which may be used in combination with any one or more of the preceding aspects (e.g., the 10th aspect), wherein the content store stores a respective copy of each of the first plurality of components of the first isolated guest referenced in the first metadata.

In accordance with a 12th exemplary aspect of the present disclosure, which may be used in combination with any one or more of the preceding aspects (e.g., the 1st aspect), wherein an orchestrator assigns the first application to execute on the system based on the content store including a plurality of components of the first application including the first component. In accordance with a 13th exemplary aspect of the present disclosure, which may be used in combination with any one or more of the preceding aspects (e.g., the 12th aspect), wherein a second component of the first application is added to the content store.

In accordance with a 14th exemplary aspect of the present disclosure, which may be used in combination with any one or more of the preceding aspects (e.g., the 1st aspect), wherein the first metadata identifies one or more acceptable versions of the first component. In accordance with a 15th exemplary aspect of the present disclosure, which may be used in combination with any one or more of the preceding aspects (e.g., the 14th aspect), wherein a first acceptable version of the first component in the content store is selected over a second acceptable version of the first component in the content store based on resolution criteria.

Aspects of the subject matter described herein may be useful alone or in combination with one or more other aspects described herein. In a 1st exemplary aspect of the present disclosure, a method comprises: receiving a request to launch a first application, wherein the first application is configured to execute in a first isolated guest; constructing a first file system of the first isolated guest based on first metadata associated with the first application; loading a first plurality of components of the first application including a first component to the first file system from a content store, wherein the first component is defined in the first metadata; and launching the first application in the first isolated guest.

In accordance with a 17th exemplary aspect of the present disclosure, which may be used in combination with any one or more of the preceding aspects (e.g., the 16th aspect), wherein the content store includes a plurality of components of a plurality of applications including the first application, and wherein each respective component of each of the respective applications of the plurality of applications is included in the content store. In accordance with a 18th exemplary aspect of the present disclosure, which may be used in combination with any one or more of the preceding aspects (e.g., the 17th aspect), wherein the plurality of components is periodically updated, and at least one application executes on at least one isolated guest while the plurality of components is updated. In accordance with a 19th exemplary aspect of the present disclosure, which may be used in combination with any one or more of the preceding aspects (e.g., the 17th aspect), wherein each component of the plurality of components is associated with a respective identifier, and wherein the respective identifier includes a version of the respective component.

In accordance with a 20th exemplary aspect of the present disclosure, which may be used in combination with any one or more of the preceding aspects (e.g., the 16th aspect), wherein a second component of the first plurality of components is loaded to the first file system after the first application begins execution. In accordance with a 21st exemplary aspect of the present disclosure, which may be used in combination with any one or more of the preceding aspects (e.g., the 20th aspect), wherein the second component is loaded in response to a memory access fault.

In accordance with a 22nd exemplary aspect of the present disclosure, which may be used in combination with any one or more of the preceding aspects (e.g., the 16th aspect), wherein the first component in the content store is updated to a new version of the first component. In accordance with a 23rd exemplary aspect of the present disclosure, which may be used in combination with any one or more of the preceding aspects (e.g., the 22nd aspect), wherein a second application associated with second metadata and a second plurality of components is launched in a second isolated guest while the first application is executing, and the second application executes with the new version of the first component.

In accordance with a 24th exemplary aspect of the present disclosure, which may be used in combination with any one or more of the preceding aspects (e.g., the 16th aspect), wherein loading the first component is achieved though a virtual link to an existing copy of the first component in the memory. In accordance with a 25th exemplary aspect of the present disclosure, which may be used in combination with any one or more of the preceding aspects (e.g., the 16th aspect), wherein the first metadata includes a plurality of references to each of a plurality of components of the first application including the first component. In accordance with a 26th exemplary aspect of the present disclosure, which may be used in combination with any one or more of the preceding aspects (e.g., the 25th aspect), wherein the content store stores a respective copy of each of the first plurality of components of the first isolated guest referenced in the first metadata.

In accordance with a 27th exemplary aspect of the present disclosure, which may be used in combination with any one or more of the preceding aspects (e.g., the 16th aspect), wherein an orchestrator assigns the first application to execute on the system based on the content store including a plurality of components of the first application including the first component. In accordance with a 28th exemplary aspect of the present disclosure, which may be used in combination with any one or more of the preceding aspects (e.g., the 27th aspect), wherein a second component of the first application is added to the content store.

In accordance with a 29th exemplary aspect of the present disclosure, which may be used in combination with any one or more of the preceding aspects (e.g., the 16th aspect), wherein the first metadata identifies one or more acceptable versions of the first component. In accordance with a 30th exemplary aspect of the present disclosure, which may be used in combination with any one or more of the preceding aspects (e.g., the 29th aspect), wherein a first acceptable version of the first component in the content store is selected over a second acceptable version of the first component in the content store based on resolution criteria.

Aspects of the subject matter described herein may be useful alone or in combination with one or more other aspects described herein. In a 31st exemplary aspect of the present disclosure, a system comprises: a means for receiving a request to launch a first application, wherein the first application is configured to execute in a first isolated guest; a means for constructing a first file system of the first isolated guest based on first metadata associated with the first application; a means for loading a first plurality of components of the first application including a first component to the first file system from a content store, wherein the first component is defined in the first metadata; and a means for launching the first application in the first isolated guest.

Aspects of the subject matter described herein may be useful alone or in combination with one or more other aspects described herein. In a 32nd exemplary aspect of the present disclosure, a computer-readable non-transitory storage medium storing executable instructions, which when executed by a computer system, cause the computer system to: receive a request to launch a first application, wherein the first application is configured to execute in a first isolated guest; construct a first file system of the first isolated guest based on first metadata associated with the first application; load a first plurality of components of the first application including a first component to the first file system from a content store, wherein the first component is defined in the first metadata; and launch the first application in the first isolated guest.

Aspects of the subject matter described herein may be useful alone or in combination with one or more other aspects described herein. In a 33rd exemplary aspect of the present disclosure, a system comprises: a plurality of hosts including a first host with a first content store and a second host with a second content store, wherein the first content store stores a first plurality of components and the second content store stores a second plurality of components; an orchestrator executing on one or more processors to: receive a first request to instantiate a first guest, wherein the first guest is configured to execute a first application; determine, based on first metadata associated with the first request, to instantiate the first guest on the first host; and send a build order to the first host, the build order including references to each component of the first guest, wherein the first guest is instantiated on the first host with a subset of the first plurality of components.

In accordance with a 34th exemplary aspect of the present disclosure, which may be used in combination with any one or more of the preceding aspects (e.g., the 33rd aspect), wherein a second guest is instantiated on the second host based on differences between the first plurality of components and the second plurality of components, and the second guest executes a different second application. In accordance with a 35th exemplary aspect of the present disclosure, which may be used in combination with any one or more of the preceding aspects (e.g., the 33rd aspect), wherein the build order is associated with a data file, which is transferred to the first host. In accordance with a 36th exemplary aspect of the present disclosure, which may be used in combination with any one or more of the preceding aspects (e.g., the 35th aspect), wherein the data file is added to the first plurality of components in the first content store. In accordance with a 37th exemplary aspect of the present disclosure, which may be used in combination with any one or more of the preceding aspects (e.g., the 35th aspect), wherein the data file is a workload processed by the first application.

In accordance with a 38th exemplary aspect of the present disclosure, which may be used in combination with any one or more of the preceding aspects (e.g., the 33rd aspect), wherein the first content store and the second content store are periodically updated from a content source. In accordance with a 39th exemplary aspect of the present disclosure, which may be used in combination with any one or more of the preceding aspects (e.g., the 38th aspect), wherein the first plurality of components is an identical copy of the second plurality of components after both the first content store and the second content store are updated. In accordance with a 40th exemplary aspect of the present disclosure, which may be used in combination with any one or more of the preceding aspects (e.g., the 38th aspect), wherein the first content store is updated while the first application is executing.

In accordance with a 41st exemplary aspect of the present disclosure, which may be used in combination with any one or more of the preceding aspects (e.g., the 33rd aspect), wherein a first component of the first plurality of components is loaded to a file system of the first guest before the first application begins executing and a second component of the first plurality of components is loaded to the file system after the first application begins executing. In accordance with a 42nd exemplary aspect of the present disclosure, which may be used in combination with any one or more of the preceding aspects (e.g., the 41st aspect), wherein the first component is loaded to the file system via a virtual link to a copy of the first component in a memory on the first host.

In accordance with a 43rd exemplary aspect of the present disclosure, which may be used in combination with any one or more of the preceding aspects (e.g., the 33rd aspect), wherein the first metadata identifies one or more acceptable versions of the first component. In accordance with a 44th exemplary aspect of the present disclosure, which may be used in combination with any one or more of the preceding aspects (e.g., the 43rd aspect), wherein a first acceptable version of the first component in the first content store is selected over a second acceptable version of the first component in the first content store based on resolution criteria.

Aspects of the subject matter described herein may be useful alone or in combination with one or more other aspects described herein. In a 45th exemplary aspect of the present disclosure, a method comprises: receiving a first request to instantiate a first guest, wherein the first guest is configured to execute a first application; determining, based on first metadata associated with the first request, to instantiate the first guest on the first host of a plurality of hosts, wherein the plurality of hosts includes a first host with a first content store storing a first plurality of components and a second host with a second content store storing a second plurality of components; and sending a build order to the first host, the build order including references to each component of the first guest, wherein the first guest is instantiated on the first host with a subset of the first plurality of components.

In accordance with a 46th exemplary aspect of the present disclosure, which may be used in combination with any one or more of the preceding aspects (e.g., the 45th aspect), wherein a second guest is instantiated on the second host based on differences between the first plurality of components and the second plurality of components, and the second guest executes a different second application. In accordance with a 47th exemplary aspect of the present disclosure, which may be used in combination with any one or more of the preceding aspects (e.g., the 45th aspect), wherein the build order is associated with a data file, which is transferred to the first host. In accordance with a 48th exemplary aspect of the present disclosure, which may be used in combination with any one or more of the preceding aspects (e.g., the 47th aspect), wherein the data file is added to the first plurality of components in the first content store. In accordance with a 49th exemplary aspect of the present disclosure, which may be used in combination with any one or more of the preceding aspects (e.g., the 47th aspect), wherein the data file is a workload processed by the first application.

In accordance with a 50th exemplary aspect of the present disclosure, which may be used in combination with any one or more of the preceding aspects (e.g., the 45th aspect), wherein the first content store and the second content store are periodically updated from a content source. In accordance with a 51st exemplary aspect of the present disclosure, which may be used in combination with any one or more of the preceding aspects (e.g., the 50th aspect), wherein the first plurality of components is an identical copy of the second plurality of components after both the first content store and the second content store are updated. In accordance with a 52nd exemplary aspect of the present disclosure, which may be used in combination with any one or more of the preceding aspects (e.g., the 51st aspect), wherein the first content store is updated while the first application is executing.

In accordance with a 53rd exemplary aspect of the present disclosure, which may be used in combination with any one or more of the preceding aspects (e.g., the 45th aspect), wherein a first component of the first plurality of components is loaded to a file system of the first guest before the first application begins executing and a second component of the first plurality of components is loaded to the file system after the first application begins executing. In accordance with a 54th exemplary aspect of the present disclosure, which may be used in combination with any one or more of the preceding aspects (e.g., the 53rd aspect), wherein the first component is loaded to the file system via a virtual link to a copy of the first component in a memory on the first host.

In accordance with a 55th exemplary aspect of the present disclosure, which may be used in combination with any one or more of the preceding aspects (e.g., the 45th aspect), wherein the first metadata identifies one or more acceptable versions of the first component. In accordance with a 56th exemplary aspect of the present disclosure, which may be used in combination with any one or more of the preceding aspects (e.g., the 55th aspect), wherein a first acceptable version of the first component in the first content store is selected over a second acceptable version of the first component in the first content store based on resolution criteria.

Aspects of the subject matter described herein may be useful alone or in combination with one or more other aspects described herein. In a 57th exemplary aspect of the present disclosure, a system comprises: a means for receiving a first request to instantiate a first guest, wherein the first guest is configured to execute a first application; a means for determining, based on first metadata associated with the first request, to instantiate the first guest on the first host of a plurality of hosts, wherein the plurality of hosts includes a first host with a first content store storing a first plurality of components and a second host with a second content store storing a second plurality of components; and a means for sending a build order to the first host, the build order including references to each component of the first guest, wherein the first guest is instantiated on the first host with a subset of the first plurality of components.

Aspects of the subject matter described herein may be useful alone or in combination with one or more other aspects described herein. In a 58th exemplary aspect of the present disclosure, a computer-readable non-transitory storage medium storing executable instructions, which when executed by a computer system, cause the computer system to: receive a first request to instantiate a first guest, wherein the first guest is configured to execute a first application; determine, based on first metadata associated with the first request, to instantiate the first guest on the first host of a plurality of hosts, wherein the plurality of hosts includes a first host with a first content store storing a first plurality of components and a second host with a second content store storing a second plurality of components; and send a build order to the first host, the build order including references to each component of the first guest, wherein the first guest is instantiated on the first host with a subset of the first plurality of components.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without dimin- The invention is claimed as follows:

1. A system comprising:
a memory storing a content store; and
a virtualization engine executing on one or more processors to:
receive a request to launch a first application, wherein the first application is configured to execute in a first isolated guest;
construct a first file system of the first isolated guest based on first metadata associated with the first application;
load a first plurality of components of the first application including a first component to the first file system from the content store, wherein the first component is defined in the first metadata, wherein the content store includes a second plurality of components of a plurality of applications including the first application, and wherein each respective component of each of the respective applications of the plurality of applications is included in the content store; and
launch the first application in the first isolated guest, wherein the first plurality of components is periodically updated, and a component in the first plurality of components of the first application executes on at least one isolated guest on the system while other components in the first plurality of components in the first application that executes on the at least one isolated guest are updated.

2. The system of claim 1, wherein a second component of the first plurality of components is loaded to the first file system after the first application begins execution in response to a memory access fault.

3. The system of claim 1, wherein the first component in the content store is updated to a new version of the first component, a second application associated with second metadata and a third plurality of components is launched in a second isolated guest while the first application is executing, and the second application executes with the new version of the first component.

4. The system of claim 1, wherein loading the first component is achieved through a virtual link to an existing copy of the first component in the memory.

5. The system of claim 1, wherein the first metadata includes a plurality of references to each of the first plurality of components of the first application including the first component, and the content store stores a respective copy of each of the first plurality of components of the first isolated guest referenced in the first metadata.

6. The system of claim 1, wherein an orchestrator assigns the first application to execute on the system based on the content store including the first plurality of components of the first application including the first component.

7. The system of claim 1, wherein the first metadata identifies one or more acceptable versions of the first component.

8. The system of claim 7, wherein a second component of the first application is added to the content store.

9. The system of claim 8, wherein a first acceptable version of the first component in the content store is selected over a second acceptable version of the first component in the content store based on resolution criteria.

10. A method comprising:
receiving a request to launch a first application, wherein the first application is configured to execute in a first isolated guest;
constructing a first file system of the first isolated guest based on first metadata associated with the first application;
loading a first plurality of components of the first application including a first component to the first file system from a content store, wherein the first component is defined in the first metadata, wherein the content store includes a second plurality of components of a plurality of applications including the first application, and wherein each respective component of each of the respective applications of the plurality of applications is included in the content store; and
launching the first application in the first isolated guest, wherein the first plurality of components is periodically updated, and a component in the first plurality of components of the first application executes on at least one isolated guest on the system while other components in the first plurality of components in the first application that executes on the at least one isolated guest are updated.

11. The method of claim 10, further comprising:
assigning the first application to execute on the system based on the content store including the first plurality of components of the first application including the first component.

12. A system comprising:
a plurality of hosts including a first host with a first content store and a second host with a second content store, wherein the first content store stores a first plurality of components of first a plurality of applications including a first application and the second content store stores a second plurality of components of a second plurality of applications including a second application, and wherein each respective component of each of the respective applications of the respective plurality of applications is included in the respective content store;
an orchestrator executing on one or more processors to:
receive a first request to instantiate a first guest, wherein the first guest is configured to execute first application;
determine, based on first metadata associated with the first request, to instantiate the first guest on the first host; and
send a build order to the first host, the build order including references to each component of the first guest, wherein the first guest is instantiated on the first host with a subset of the first plurality of components, wherein the first plurality of components is periodically updated, and a component in the first plurality of components of the first application executes on at least one isolated guest on the system while other components in the first plurality of components in the first application that executes on the at least one isolated guest are updated.

13. The system of claim 12, wherein a second guest is instantiated on the second host based on differences between the first plurality of components and the second plurality of components, and the second guest executes a different second application.

14. The system of claim 12, wherein the build order is associated with a data file, which is transferred to the first host, and the data file is one of (i) a new component added to the first plurality of components in the first content store, and (ii) a workload processed by the first application.

15. The system of claim 12, wherein the first content store and the second content store are periodically synchronized from a content source.

16. The system of claim 12, wherein a first component of the first plurality of components is loaded to a file system of the first guest before the first application begins executing and a second component of the first plurality of components is loaded to the file system after the first application begins executing.

17. The system of claim 12, wherein the first metadata identifies one or more acceptable versions of the first component, and a first acceptable version of the first component in the first content store is selected over a second acceptable version of the first component in the first content store based on resolution criteria.

* * * * *

UNITED STATES PATENT AND TRADEMARK OFFICE
CERTIFICATE OF CORRECTION

PATENT NO. : 10,649,802 B2
APPLICATION NO. : 15/927713
DATED : May 12, 2020
INVENTOR(S) : Woods et al.

Page 1 of 1

It is certified that error appears in the above-identified patent and that said Letters Patent is hereby corrected as shown below:

In the Claims

In Column 28, Line 40 (Claim 12), replace "execute first" with --execute a first--.

Signed and Sealed this
Seventh Day of July, 2020

Andrei Iancu
*Director of the United States Patent and Trademark Office*